J. E. PARRISH.
BROADCASTING MECHANISM.
APPLICATION FILED JAN. 26, 1914.
1,107,992.
Patented Aug. 18, 1914.
2 SHEETS—SHEET 1.
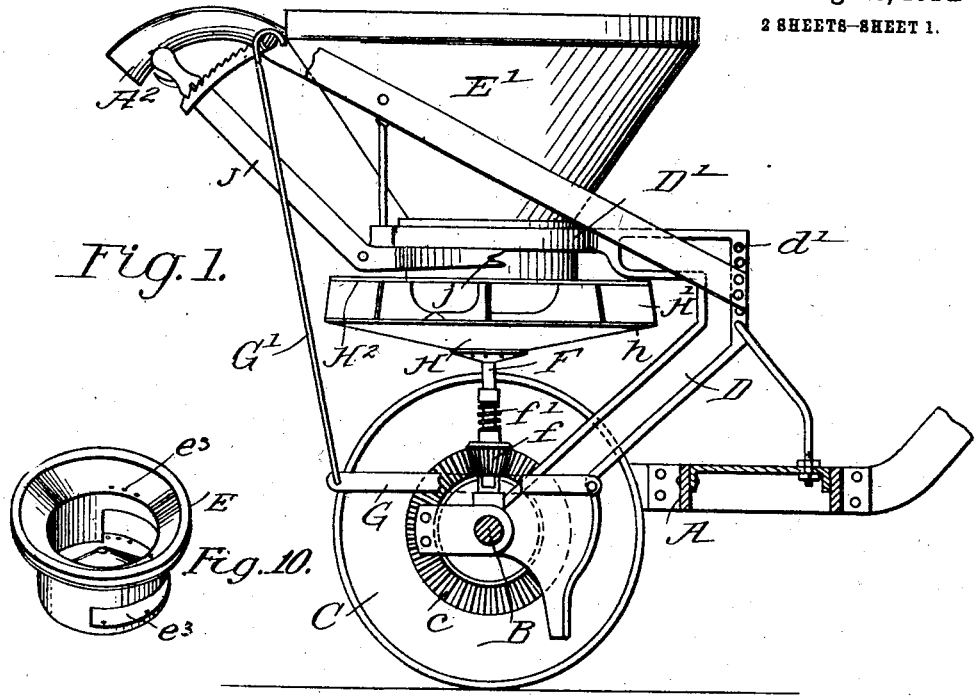
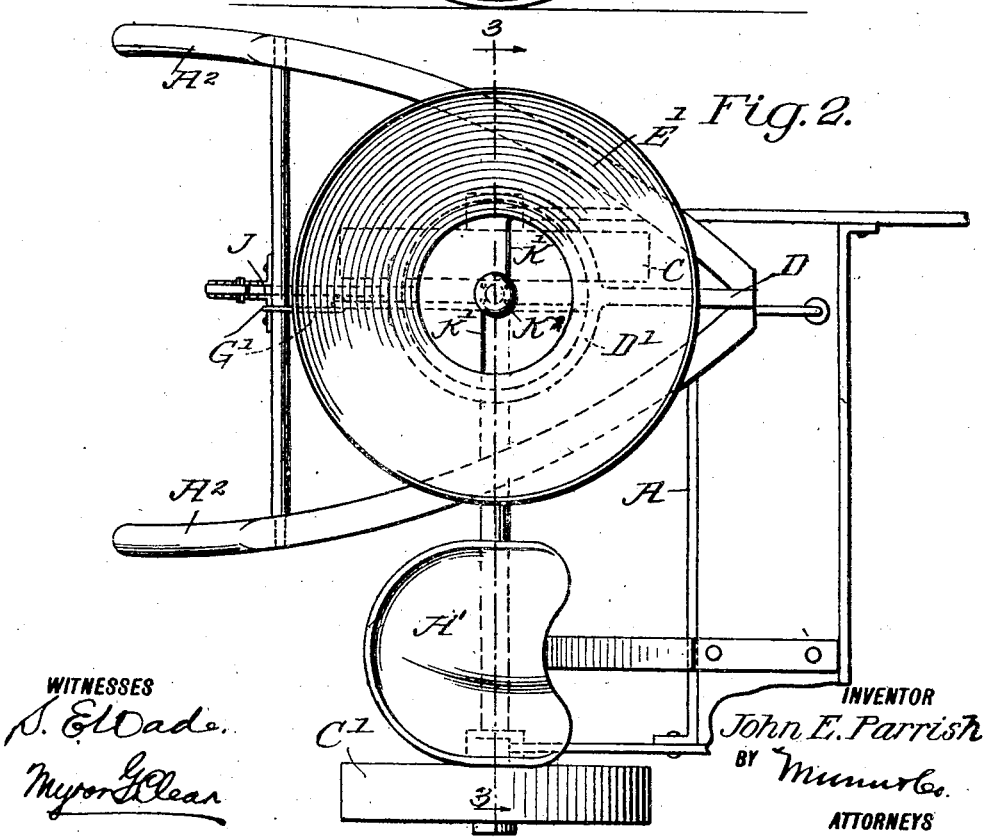
WITNESSES
S. E. Wade.
Myron G. Clear.
INVENTOR
John E. Parrish
BY Munn & Co.
ATTORNEYS J. E. PARRISH.
BROADCASTING MECHANISM.
APPLICATION FILED JAN. 26, 1914.
1,107,992.
Patented Aug. 18, 1914.
2 SHEETS—SHEET 2.
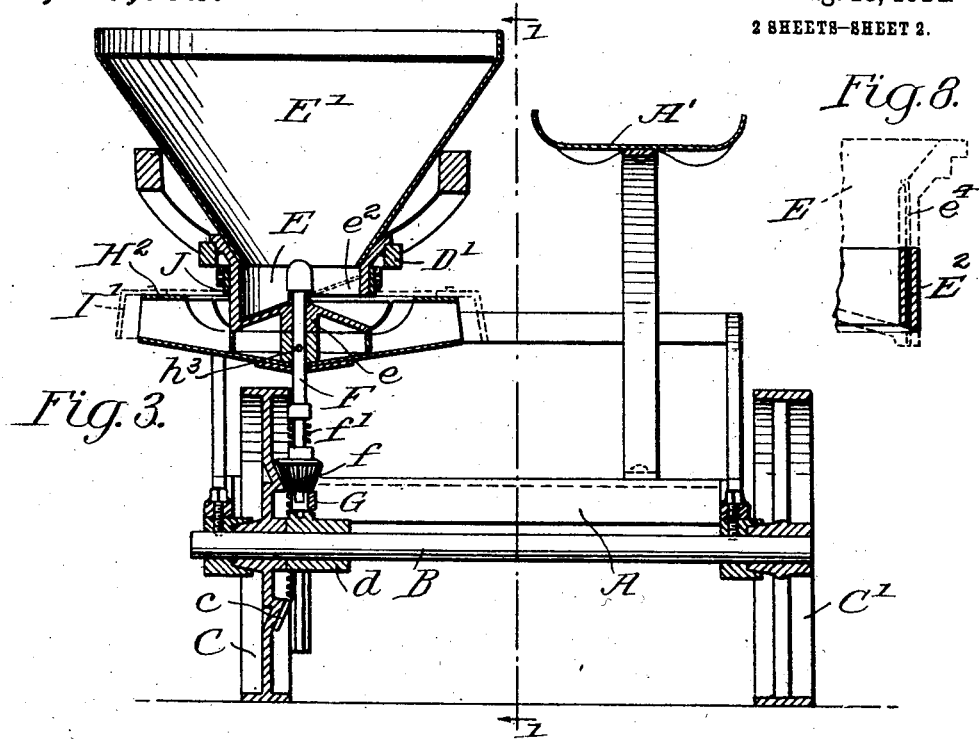
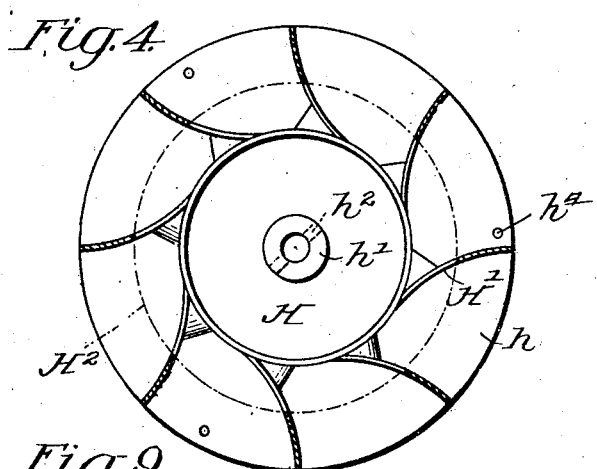
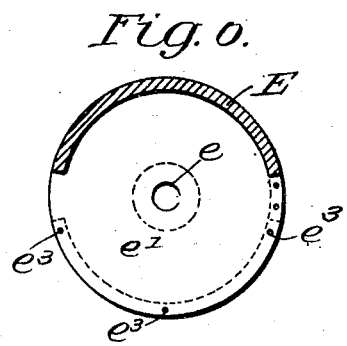
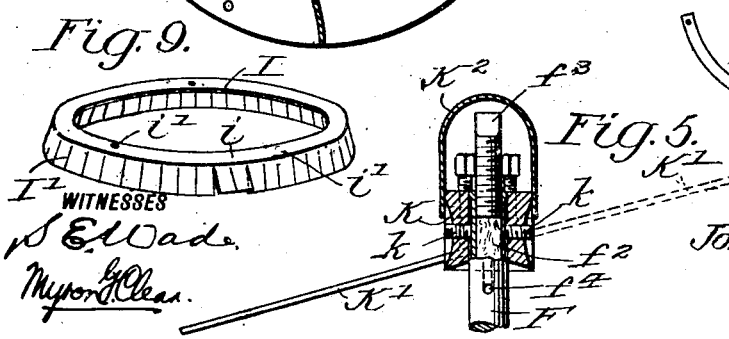
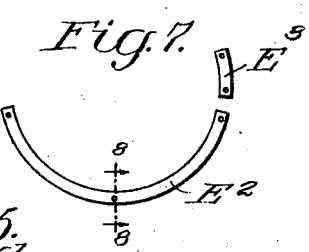
INVENTOR
John E. Parrish
BY
ATTORNEYS

UNITED STATES PATENT OFFICE.

JOHN E. PARRISH, OF RICHMOND, VIRGINIA.

BROADCASTING MECHANISM.

1,107,992.   Specification of Letters Patent.   Patented Aug. 18, 1914.

Application filed January 26, 1914. Serial No. 814,438.

*To all whom it may concern:*

Be it known that I, JOHN E. PARRISH, a citizen of the United States, and a resident of Richmond, in the county of Henrico and State of Virginia, have invented an Improvement in Broadcasting Mechanism, of which the following is a specification.

My present invention relates generally to broadcasting machines, and more particularly to an agricultural machine by which a supply of material may be constantly broadcasted within well defined limits as to direction and extent under control of the operator, the object of my present improvement being to provide a broadcasting mechanism having certain novel features, arranged to permit of the broadcasting of liquid and powder poisons, and various forms of fertilizer as well as seed of various sizes and kinds. In carrying out these objects, I utilize the construction, arrangement and operation of the various parts shown in the accompanying drawings, which form a part of the specification, and in which—

Figure 1 is a vertical longitudinal section through a machine including my improved mechanism, and taken substantially on line 1—1 of Fig. 3. Fig. 2 is a plan view of the machine. Fig. 3 is a transverse vertical section, taken substantially on line 3—3 of Fig. 2. Fig. 4 is a detail horizontal section through the broadcasting member. Fig. 5 is a detail vertical section through the stirring arrangement. Fig. 6 is a detail horizontal section through the cast base of the hopper. Fig. 7 is a plan view of the hopper closing strips. Fig. 8 is a vertical cross section through one of the strips shown in Fig. 7 and taken substantially on line 8—8 of said figure, those parts of the cast base of the hopper immediately surrounding the strip being indicated by dotted lines, and Fig. 9 is a perspective view of the feeding hood, the usual operative position of which is shown in dotted lines in Fig. 3. Fig. 10 is a perspective view of the cast base of the hopper.

Referring now to these figures, the frame generally indicated at A supports a transverse axle B having wheels C and C', wheel C having an integral inwardly facing beveled gear $c$ formed thereon.

Mounted in and rising from the frame A, which is provided with a driver's seat A' and handles $A^2$, is a forwardly and upwardly inclined bracket D preferably formed of cast metal and the lower portion of which is provided with a bearing $d$ through which the shaft B extends, as best shown in Fig. 3. The frame generally indicated at A as before stated is also provided with suitable draft means and is detachable from the shaft B and may be removed with said shaft and a short shaft substituted to connect the bearing $d$ of the bracket D and the wheel C when it is desired to use the broadcasting mechanism as a walking machine. Hence the handles $A^2$ are provided and the upper forward portion of the bracket D has a vertical series of apertures $d'$ to which draft connections may be had.

The bracket D is important for the above reasons and due further to the fact that it is provided with a rearwardly extending portion in the form of a circular frame D' upon which the grooved upper outer edge of the cast hopper base E is revolubly seated, these parts being located above the wheel C and axle B and the hopper base E having a central lower bearing $e$ loosely journaled upon the upper end portion of a vertical shaft F, the lower end of which has a splined beveled gear $f$ normally in engagement with the integral gear $c$ of the wheel C. This beveled gear $f$ is held in position by a spring $f'$, against the tension of which it may be moved out of contact with gear $c$ through the use of a lever G extending beneath gear $f$, said lever being pivoted at its forward end upon the lower portion of the bracket D and having an upwardly projecting rod G' connected to its rear end, whereby it may be raised to disengage the gears when desired, all as best shown in Fig. 1.

Disposed upon the vertical shaft F below the cast hopper base E is a broadcasting member H, consisting of a conical base $h$ to which is secured a central bearing $h'$ having transverse apertures $h^2$ which may be secured to the shaft F by a transverse pin $h^3$.

The broadcasting member H also has a plurality of curved tangential vanes H', and in practice is rotated by shaft F so that any material disposed between the several vanes H' will be thrown outwardly due to the centrifugal motion of the member and in an upward direction due to the conical base $h$ thereof. Adjacent their outer ends the vanes H' are increased in height and are connected by an upper circular strip $H^2$, bracing these series of vanes H' and serving to form a support for the feeding hood I, shown in detail in Fig. 9 and indicated by dotted lines in Fig. 3.

The strip $H^2$ and the conical base $h$ of the broadcasting member are provided with series of apertures, the apertures of the base being indicated at $h^4$ in Fig. 4, so that the body of the hood I, in the form of a circular strip $i$ having apertures $i'$, may be secured upon either the strip $H^2$ or the base $h$ with its flanged portion I' projecting downwardly and upwardly in the two positions respectively.

It will be noted that the flanged portion I' of the hood I is transversely slitted around its circumference, and that there are thus formed a circular series of free tongues, which may be readily bent to any desired angle and the deflection of the material from the broadcasting member thus controlled. By the use of the hood secured upon the plate $H^2$ as seen in dotted lines in Fig. 3, the material from the broadcasting member will be deflected in a downward direction and prevented from spreading beyond the extent desired and controlled by bending the several tongues of the flange I' to the proper position. The same is true when this position of the hood is reversed, and it is secured to the base $h$ of the broadcasting member except that in this position the material will be thrown upwardly beneath the upper portions of comparatively high grown plants. This is particularly desirable in connection with the application of vermin destroying poisons, either powdered or liquid.

The hopper E' in which the material is initially introduced is in the form of an inverted cone, the lower truncated end of which is disposed within and secured to the upper outwardly flaring portion of the cast base E before mentioned, and communicates freely with the interior of this cast base, the latter having a conical base $e'$ and having its wall cut away in order to provide a feed slot $e^2$ above the base $e'$ and extending for a distance slightly over one half the circumference of said base, as will best be seen by reference to Fig. 6. Thus the material is normally fed through the slot $e^2$ and onto the distributing member H, the latter promptly broadcasting it so that the direction in which the material is thrown may be controlled by circular adjustment of the hopper E' and its base E, which are freely disposed upon the circular portion D' of the bracket D, as before described. With the parts in the position shown in Figs. 3 and 6, the material will be broadcast over a semicircular area either to the right, left or rear as desired.

The wall of the cast hopper base E above its feed slot $e^2$ and also the conical base $e'$ have vertical apertures $e^3$ for the reception of pins $e^4$ adapted to pass also through supplemental closure members $E^2$ and $E^3$, the former being somewhat elongated so as to close the feed slot $e^2$ except for small spaces at opposite sides. When the closure strip $E^2$ is in position, as indicated in dotted lines in Fig. 6, the material is fed from the hopper base through two small feed openings at diametrically opposite points and is consequently broadcast from member H in diametrically opposite directions which, with the hood I in use and in the position shown in dotted lines in Fig. 3, permits seed, fertilizer or poison to be drilled along spaced lines the width of which will depend upon the inclination of the tongues of the flange I' of the hood. In like manner the other and shorter closure strip $E^3$ may be connected within the wall of the hopper base to close the small feed space at one side when material is to be drilled in a single line.

The amount of material to be fed may be conveniently controlled by a band J encircling the wall of the cast hopper base E, as best shown in Fig. 3, and movable vertically thereon, to a position partially or wholly covering the feed slot $e^2$, by means of a lever J' intermediately pivoted on a portion of the bracket D and having a yoke at its forward end, the extremities of which engage trunnions $j$ projecting from the sides of the controlling band J.

The upper extremity of the shaft F is vertically bored to form a space $f^2$ for holding lubricant and is provided with a set screw $f^3$ threaded into the end of the bore and a lateral opening $f^4$ communicating with said bore and by which the lubricant is fed to the bearing $e$ of the hopper base. This extremity of the shaft F, as best shown in Fig. 5, is also provided with a head K secured thereon by set screws $k$ and provided with outwardly projecting stirring arms K' projecting within the cast hopper base E to constantly agitate the material therein during use, the head K being protected by a cap $K^2$. Thus it is simply necessary to release set screw $k$ in order that the stirring head K may be removed and provide for the removal of the hopper and its cast base and also of the broadcasting member H.

Thus from the foregoing it is believed that the advantages of my improved broadcasting mechanism may be clearly understood and readily appreciated, either in connection with various forms of fertilizer and liquid or powdered vermin destroying poisons, or with various kinds of seed.

I claim:—

1. In a device of the character described, the combination of a broadcasting member, a supporting bracket having a portion extending horizontally above the broadcasting member and in the form of a ring, and a feed hopper having its base extending downwardly through the ring and provided with a slotted opening in its side wall to deliver material upon the broadcasting member, and also provided with a grooved upper edge loosely seated upon the said ring of the bracket whereby the hopper and its base may be freely rotated in order to control the direction in which the material is thrown.

2. In a device of the character described, the combination of a broadcasting member, a feed hopper having its base provided with a slotted feed aperture opening laterally above the broadcasting member, a feed controlling band surrounding the hopper base and movable vertically thereon to partially and wholly cover the said feed aperture, an intermediately pivoted lever having a yoke at one end and a handle at its opposite end, the arms of which yoke engage the said feed band at diametrically opposite points for raising and lowering the latter and means engaging the handle end of the lever to hold the same and the feed band in adjusted position.

3. In a device of the character described, the combination of a feed hopper, a broadcasting member disposed horizontally below the feed hopper to receive material therefrom and having a circular strip around its outer edge and spaced above the base thereof, and a feed controlling hood consisting of a circular strip which may be secured to the said strip of the broadcasting member and also to the base thereof, said hood having a surrounding flange provided with a plurality of transverse slits forming free tongues which may be adjusted to the desired angle.

4. In a device of the character described, the combination of a feed hopper, a broadcasting member disposed horizontally below the feed hopper, and a feed controlling hood consisting of a body strip having a flange extending around its outer edge and provided with a plurality of transverse slits forming free tongues therebetween which may be bent to the desired angles, said hood being adapted to be secured to the upper and lower outer edges of the broadcasting member so as to project its flange respectively in downward and upward extending positions, all for the purpose described.

5. In a device of the character described, the combination of a centrifugal broadcasting member, means for rotating said member, a feed hopper mounted above the broadcasting member and having its base provided with a slotted opening through the wall thereof and extending therearound for a distance somewhat over half the circumference thereof, said wall having a series of vertical apertures along said feed opening, supplemental pieces adapted for disposition within said feed opening and also having vertical apertures to aline with the said wall apertures, and locking pins for engagement through the alined apertures to secure the said supplemental pieces in position.

6. In a device of the character described, the combination of a broadcasting member, means for rotating said member, a feed hopper mounted above the broadcasting member and having its base provided with a single slotted feed opening extending through the wall thereof and partially therealong, supplemental pieces for selective disposition within said slotted feed opening to convert the same into one or more feed ports, and means for securing the said supplemental pieces in position.

JOHN E. PARRISH.

Witnesses:
 MYRON G. CLEAR,
 SOLON C. KEMON.